United States Patent [19]

Kim

[11] Patent Number: 5,777,680
[45] Date of Patent: Jul. 7, 1998

[54] VIDEO SIGNAL ENCODING SYSTEM CONTROLLER FOR DECIDING AN INTER/ INTRA MODE, A FIELD/FRAME DCT MODE, AND A QUANTIZATION PARAMETER

[75] Inventor: Sung-Jung Kim, Seoul, Rep. of Korea

[73] Assignee: Daewoo Electronics Co., Ltd., Seoul, Rep. of Korea

[21] Appl. No.: 671,187

[22] Filed: Jun. 27, 1996

[30] Foreign Application Priority Data

Jun. 30, 1995 [KR] Rep. of Korea .............. 95-19181

[51] Int. Cl.⁶ .............................................. H04N 7/12
[52] U.S. Cl. ............................... 348/405; 348/419
[58] Field of Search ..................... 348/405, 419, 348/390, 384, 403, 404, 407, 420, 422, 397, 415, 416, 27; H04N 7/12

[56] References Cited

U.S. PATENT DOCUMENTS

| | | | |
|---|---|---|---|
| 5,073,820 | 12/1991 | Nakagawa et al. | 348/405 |
| 5,136,376 | 8/1992 | Yagasaki et al. | 348/384 |
| 5,144,424 | 9/1992 | Savatier | 348/405 |
| 5,146,324 | 9/1992 | Miller et al. | 348/405 |
| 5,307,163 | 4/1994 | Hatano et al. | 348/415 |
| 5,333,012 | 7/1994 | Singhal et al. | 348/405 |
| 5,349,383 | 9/1994 | Parke et al. | 348/397 |
| 5,421,023 | 5/1995 | Murakami | 348/416 |
| 5,426,463 | 6/1995 | Reininger et al. | 348/405 |
| 5,461,422 | 10/1995 | Hsieh | 348/405 |
| 5,467,372 | 11/1995 | Nishitani | 348/384 |
| 5,469,208 | 11/1995 | Dea | 348/27 |

*Primary Examiner*—Tommy P. Chin
*Assistant Examiner*—Y. Lee
*Attorney, Agent, or Firm*—Pennie and Edmonds, LLP

[57] ABSTRACT

A controller, for use in a video signal encoding system, which decides an inter/intra mode, a field/frame DCT mode and a quantization parameter, wherein the video signal contains a multiplicity of GOP's each of which is classified into three types of pictures, with each of the pictures being divided into a multiplicity of macroblocks. The encoding system encodes the video signal on a macroblock basis. The controller is provided with: 1) a state machine for generating a control sequence which includes a plurality of control signals in response to the type of a picture currently encoded and a signal denoting a start of the picture; 2) an arithmetic unit, for generating in response to the control sequence, a set of control values which denote the inter/intra mode, the field/frame DCT mode and the quantization parameter for each of the macroblocks in the picture, by calculating a group of predetermined equations based on the sequential number of the macroblock currently being encoded and predetermined initial constant values; and 3) a memory and input/output unit for storing the initial constant values, providing the initial constant values to the arithmetic unit, storing the set of control values determined by the arithmetic unit and providing the control values to be used in encoding the video signal.

14 Claims, 5 Drawing Sheets ained and from the fact that QP determines the amount of data generated by the encoding process and, therefore, it must be controlled to prevent a buffer from overflowing or underflowing.

VIDEO SIGNAL ENCODING SYSTEM CONTROLLER FOR DECIDING AN INTER/INTRA MODE, A FIELD/FRAME DCT MODE, AND A QUANTIZATION PARAMETER

FIELD OF THE INVENTION

The present invention relates to a controller for use in a video signal encoding system; and, more particularly, to a controller which controls the amount of data from the encoding system by determining a quantization parameter, thereby preventing a buffer from overflowing or underflowing, and which also decides an inter/intra and a field/frame DCT (Discrete Cosine Transform) modes of the encoding system.

DESCRIPTION OF THE PRIOR ART

With recent advances in communication and integrated circuit technologies, transmission of digitized video signals has become a common reality. When an image signal comprising a sequence of image "frames" is expressed in a digital form, a substantial amount of data is generated for transmission, especially in the case of a high definition television system. Since, however, the available frequency bandwidth of a conventional transmission channel is limited, in order to transmit the substantial amounts of digital data therethrough, it is inevitable to employ compression techniques which reduce the volume of the transmission data without losing the subjective quality of images. In this regard, several international standards for the compression of digital video signals have emerged over the past decades, with still more under current development. One of such standards is ISO/IEC MPEG standard which has been developed by the Moving Picture Expert Group(MPEG), part of a joint technical committee of the International Standard Organization (ISO) and the International Electrotechnical Commission (IEC). The standard prescribes the syntax of a compressed bit stream and the method of decoding, but leaves considerable latitude to allow variations in the algorithm employed in an encoding system. As the present invention is intended for use in such an encoding system, in order to facilitate an understanding of the invention, some pertinent aspects of the MPEG video compression algorithm will be explained. However, it is to be noted that the invention can also be applied to other video coding algorithms which share some of the features of the MPEG algorithm that are directly related to the present invention.

An MPEG video sequence may be divided into sets of consecutive pictures or frames, each set known as a Group of Pictures(GOP). Each GOP includes a plurality of pictures, each of which is in turn subdivided into slices. Further, each slice consists of a number of macroblocks(MB's), while each MB is made of four 8×8 luminance blocks and two 8×8 chrominance blocks.

Within a GOP, three types of pictures may appear. A first type of pictures, i.e., Intra-mode pictures or I-pictures, are compressed independently of any other pictures. The other two types of pictures are predictively motion compensated pictures (P-pictures) and bidirectionally motion-compensated pictures (B-pictures).

A motion compensation is a compression method to remove redundancies residing between consecutive pictures. In MPEG, each MB is compared with 16×16 regions in a same general spatial location in a reference frame. Frames which are predictively motion compensated using a single preceding frame in the past as the reference frame are P-pictures. This kind of prediction is referred to as a forward-in-time prediction. In B-pictures, backward-in-time prediction is used in addition to the forward-in-time prediction. In I-pictures, all macroblocks are encoded in an intra-mode, i.e., coded by itself without considering the motion compensation. In P-pictures and B-pictures, each macroblock can be coded either in the intra-mode or in an inter-mode wherein the macroblock is coded using motion compensation. To choose one of the two coding modes for a macroblock, VAR and VAROR are first computed as follows:

$$VAR = \frac{\sum_{i=1}^{16}\sum_{j=1}^{16} [O(i,j) - S(i,j)]^2}{256} \quad \text{(Eq. 1A)}$$

$$VAROR = \frac{\sum_{i=1}^{16}\sum_{j=1}^{16} O(i,j)^2 - ave[O(i,j)]}{256} \quad \text{(Eq. 1B)}$$

wherein O(i,j) and S(i,j) denote pixel values in an original macroblock to be coded and pixel values in a macroblock reconstructed by using a conventional motion compensation method, respectively; and ave[O (i,j)] is an average value of O(i, j) in the macroblock. It is noted that VAR and VAROR are related to the amount of data obtained in encoding the macroblock by using the inter and the intra modes, respectively. As shown in FIG. 5, the inter/intra mode is decided according to values of VAR and VAROR.

In the MPEG and several other compression standards, the discrete cosine transform (DCT) is employed. Two types of DCT, i.e., a field-based and a frame-based DCT, can be used selectively in the MPEG encoding procedure which uses an interlaced scanning to define a frame. Horizontal lines which form a frame are divided into an odd and an even fields, wherein even lines(lines 2,4,6 . . . ) form the even field and odd lines (lines 1,3,5, . . . ) form the odd field. A digitized interlaced video signal can be compressed by either "field mode" or "frame mode". In the field mode, each frame is separated into its even and odd fields which are processed independently. In the frame mode, the two fields are processed as a single frame by interleaving the lines of corresponding even and odd fields. Neither option is entirely satisfactory for video compression. Since each frame has twice the number of lines that exists in a field for a given image, there will be more correlations among samples and hence, compressibility will be increased. However, in detailed moving areas, the frame mode processing suffers from spurious high vertical frequencies introduced by interleaving the even and the odd fields.

In regard to DCT, the field/frame DCT mode is selected on a macroblock basis. One of the criteria for deciding the mode of DCT is explained using the following equations(see Test Model 4, ISO-IEC/JTC1/SC29/WG11 MPEG93/225).

$$VAR1 = \sum_{i=1}^{16}\sum_{j=1}^{15} [O(i,j) - O(i,j+1)]^2 \quad \text{(Eq. 2A)}$$

$$VAR2 = \sum_{i=1}^{16}\sum_{j=1}^{14} [O(i,j) - O(i,j+2)]^2 \quad \text{(Eq. 2B)}$$

For macroblocks whose VAR1 is larger than VAR2, the frame based DCT is used and vice versa.

The DCT coefficients obtained by the field-based or the frame-based DCT are subject to a quantization. The quantization is achieved by dividing a block of DCT coefficients by $W_{mn} \times QP$, with Wmn denoting a weighting factor matrix and QP being a quantization parameter. The weighting factor allows a coarser quantization applied to less visually significant coefficients. The quantization parameter QP functions as a means for trading off an image quality against a bit rate. QP can vary from one MB to another within a picture. Due to this feature, known as an adaptive quantization, different regions of each frame can be quantized with different quantization step sizes.

After the quantization, the quantized coefficients are encoded by using variable length coding (VLC) such as Huffman coding. The amount of data resulting from VLC varies with time depending on the video signal characteristics. Therefore, a rate control scheme is needed to adjust the encoded data to a given transmission rate. As described above, such a rate controller serves to control the amount of encoded data by varying the quantization parameter QP according primarily to, e.g., the buffer fullness and activity of an input image.

One of the schemes for controlling the bit rate by adapting the quantization parameter on a macroblock basis will be described. The whole procedure works in three steps: target bit allocation; rate control; and adaptive quantization. In the first step, the number of bits available to encode a next frame is estimated. In the second step, a reference value of the quantization parameter for each macroblock is decided by means of a virtual buffer. Finally, the reference value of the quantization parameter is adjusted according to the spatial activities in the macroblock to derive the quantization parameter. Each of the steps will now be described in greater detail.

<The First Step: Bit Allocation>

After a picture of a certain type (I, P or B-picture) is encoded, a respective "global complexity measure" ($X_i$, $X_p$ or $X_b$) is updated as follows:

$$X_i = S_i \times Q_i \qquad \text{(Eq. 3A)}$$

$$X_p = S_p \times Q_p \qquad \text{(Eq. 3B)}$$

$$X_b = S_b \times Q_b \qquad \text{(Eq. 3C)}$$

wherein $S_i$, $S_p$ or $S_b$ represents the number of bits generated by encoding the corresponding picture and $Q_i$, $Q_p$ or $Q_b$ is an average quantization parameter computed by averaging the actual quantization parameter values for all the macroblocks in the picture.

At the start of the encoding process, the initial constant values of the complexity measure are determined as:

$$X_i = 160 \times \text{BIT\_RATE}/115 \qquad \text{(Eq. 3D)}$$

$$X_p = 60 \times \text{BIT\_RATE}/115 \qquad \text{(Eq. 3E)}$$

$$X_b = 42 \times \text{BIT\_RATE}/115 \qquad \text{(Eq. 3F)}$$

wherein the value of BIT_RATE is a predetermined constant measured in bits/sec.

After $X_i$, $X_p$ or $X_b$ has been decided, a target bit number, i.e., an estimated number of bits generated in encoding a next picture, is decided in advance.

The target bit number for an I, P or B picture ($T_i$, $T_p$ or $T_b$) is computed as:

$$T_i = \max\left[\frac{R}{1 + \frac{N_p \times X_p}{X_i \times K_p} + \frac{N_b \times X_b}{X_i \times K_b}}, \frac{\text{BIT\_RATE}}{8 \times \text{PICTURE\_RATE}}\right] \qquad \text{(Eq. 4A)}$$

$$T_p = \max\left[\frac{R}{N_p + \frac{N_b \times K_p \times X_b}{K_b \times X_p}}, \frac{\text{BIT\_RATE}}{8 \times \text{PICTURE\_RATE}}\right] \qquad \text{(Eq. 4B)}$$

$$T_b = \max\left[\frac{R}{N_b + \frac{N_p \times K_b \times X_p}{K_p \times X_b}}, \frac{\text{BIT\_RATE}}{8 \times \text{PICTURE\_RATE}}\right] \qquad \text{(Eq. 4C)}$$

wherein $K_p$ and $K_b$ are predetermined constants.

R is the remaining number of bits assigned to the current GOP and updated after encoding a picture as follows:

$$R = R - S_i \text{ (or } S_p \text{ or } S_b\text{)} \qquad \text{(Eq. 5)}$$

wherein $S_i$ (or $S_p$ or $S_b$) is the number of bits generated in the frame just encoded, with the subscript i, p or b denoting the type of the frame. The value of R before a first picture in a GOP is encoded is decided as:

$$R = G + R \qquad \text{(Eq. 6A)}$$

$$G = \text{BIT\_RATE} \times N/\text{PICTURE\_RATE} \qquad \text{(Eq. 6B)}$$

wherein N is a constant denoting the number of pictures in the GOP and the value of PICTURE_RATE is a predetermined constant. At the start of the encoding process, the initial constant value of R is 0.

In Eqs. 4A to 4C, $N_p$ and $N_b$ are the numbers of P-pictures and B-pictures remaining in the current GOP. Therefore, at the start of a GOP, $N_p$ and $N_b$ are the total numbers of P-pictures and B-pictures included in the GOP, respectively.

<The Second Step: Rate Control>

At this step, a reference quantization parameter is calculated for each macroblock based on the concept of the virtual buffer.

Before encoding macroblock j, fullness of the virtual buffer is determined depending upon the type of the picture as follows:

$$d_j^i = d_0^i + B_{j-1} - \frac{T_i \times (j-1)}{\text{MB\_cnt}} \qquad \text{(Eq. 7A)}$$

$$d_j^p = d_0^p + B_{j-1} - \frac{T_p \times (j-1)}{\text{MB\_cnt}} \qquad \text{(Eq. 7B)}$$

$$d_j^b = d_0^b + B_{j-1} - \frac{T_b \times (j-1)}{\text{MB\_cnt}} \qquad \text{(Eq. 7C)}$$

wherein $d_0^i$, $d_0^p$ and $d_0^b$ represent fullness of the virtual buffer at the start of a picture for the respective picture types; $B_j$ is the number of bits generated by encoding all macroblocks in the current picture up to and including the macroblock j; MB_cnt is the number of macroblocks in the picture; and $d_j^i$, $d_j^p$ and $d_j^b$ are fullness of virtual buffers at macroblock j, for the respective picture types.

The final fullness of the virtual buffer at the end of the picture (i.e., $d_j^i$, $d_j^p$, $d_j^b$ when j=MB_cnt) is used as $d_0^i$, $d_0^p$ and $d_0^b$ for encoding a next picture of the same type.

Then, the reference quantization parameter ($Q_j$) for the macroblock j is determined as follows:

$$Q_j = (d_j \times 31)/r \qquad \text{(Eq. 8)}$$

wherein $r = 2 \times \text{BIT\_RATE}/\text{PICTURE\_RATE}$ and $d_j$ is the fullness of the virtual buffer.

At the start of the encoding process, the fullness value for the virtual buffer is:

$$d_0^i = 10 \times r/31 \qquad \text{(Eq. 7D)}$$

$$d_0^p = K_p d_0^i \qquad \text{(Eq. 7E)}$$

$$d_0^b = K_b d_0^i \qquad \text{(Eq. 7F)}$$

<The Third Step: Adaptive Quantization>

At this step, Mquant (modified quantization parameter) actually used in quantizing each macroblock is calculated from the reference quantization parameter based on the spatial activity of the image.

The spatial activity measure for the macroblock j is computed from the four luminance frame-organized blocks and the four field-organized blocks of the macroblock j using the intra pixel values as:

$$act_j = \frac{1 + \min(var\_sblk)}{sblk = 1 \text{ to } 8} \quad \text{(Eq. 9)}$$

wherein $$var\_sblk = \frac{1}{64} \sum_{k=1}^{64} (P_k - P_{mean})^2 \quad \text{(Eq. 10)}$$

and $$P_{mean} = \frac{1}{64} \sum_{k=1}^{64} P_k \quad \text{(Eq. 11)}$$

with $P_k$ being pixel values in the original block. In case of the frame-organized blocks, a block consists of 8 successive lines while in case of the field-organized blocks, lines of the odd field and the even field are divided to form separate blocks.

Then, the normalized $act_j$ (N_$act_j$) is determined as $$N\_act_j = \frac{2 \times act_j + avg\_act}{act_j + 2 \times avg\_act} \quad \text{(Eq. 12)}$$

wherein avg_act is the average value of $act_j$ for the last picture. On the first picture avg_act is 400.

Thereafter, Mquant is finally determined as follows:

$$Mquant_j = Q_j \times N\_act_j. \quad \text{(Eq. 13)}$$

The final value of $Mquant_j$ is clipped to a range of 1 to 31 and is used in the quantization process.

By doing this, in case the number of bits resulting from the encoding process exceeds a predetermined value (data fed to the buffer increases), a quantization step size is decreased and vice versa, to thereby render the buffer fullness to a certain level.

The three tasks described above, i.e., the inter/intra and the field/frame DCT mode and the quantization parameter decisions, relate to a series of mathematical processes. Although these jobs can be done by using a general purpose processor, it is advantageous in terms of cost and speed to design a circuit which is dedicated to these tasks.

SUMMERY OF THE INVENTION

It is, therefore, a primary object of the present invention to provide a structure and an operating scheme of the controller which calculates the quantization parameter, and decides the inter/intra mode and the field/frame DCT mode.

In accordance with the present invention, there is provided a controller, for use in a video signal encoding system, for deciding an inter/intra mode, a field/frame DCT mode and a quantization parameter, wherein the video signal contains a multiplicity of GOP's each of the GOP's being classified into three types of pictures, with each of the pictures being divided into a multiplicity of macroblocks, and the encoding system encodes the video signal on a macroblock basis, the controller comprising:

a state machine for generating a control sequence which includes a plurality of control signals in response to the type of a picture currently encoded and a signal denoting a start of the picture;

an arithmetic unit for generating, in response to the control sequence, a set of control values for each of the macroblocks in the picture, the set of control values denoting the inter/intra mode, the field/frame DCT mode and the quantization parameter, by calculating a group of predetermined equations based on the sequential number of a macroblock currently encoded and predetermined initial constant values; and a memory and input/output unit for storing the initial constant values, providing the initial constant values to the arithmetic unit, storing the set of control values determined at the arithmetic unit and providing the control values to be used in encoding the video signal.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
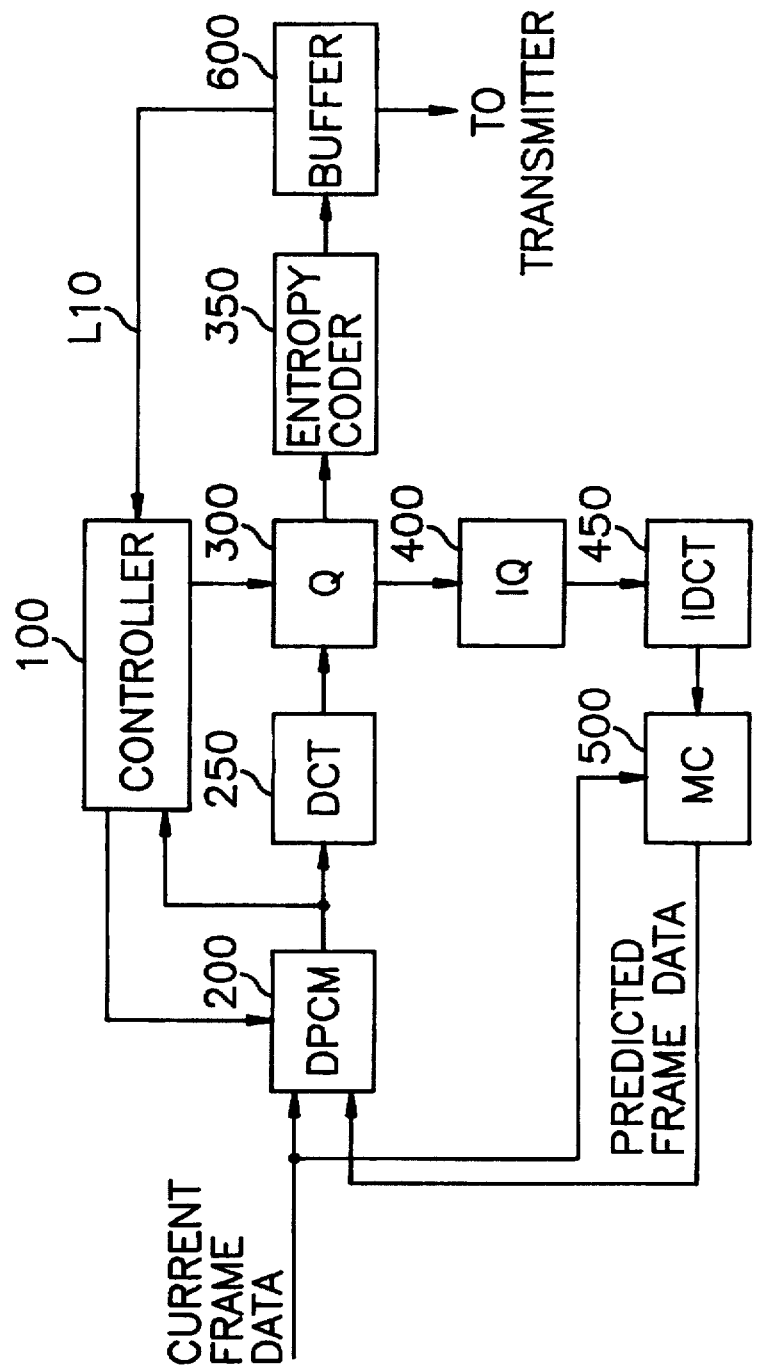
FIG. 1 shows a block diagram of a video signal encoding system which employs a controller of the present invention.

With reference to FIG. 1, there is shown a block diagram of a conventional video encoding system which employs a controller 100 of the present invention, which decides an inter/intra mode, a field/frame DCT mode and a quantization parameter Mquant.

First, current frame data of a video signal to be encoded is fed to a DPCM block 200 and a motion compensation ("MC") block 500. Predicted frame data from the MC block 500 is also fed to the DPCM block 200. Actually, the video data is provided and processed on a macroblock basis throughout the encoding process. At the DPCM block 200, the difference between the predicted frame data and the current frame data, or the current frame data itself is provided to a DCT block 250 depending upon a coding mode, i.e., inter/intra mode of a relevant macroblock. The difference or the current frame data is transformed by using, e.g., DCT, at the DCT block 250 and transform coefficients are fed to a quantization ("Q") block 300 and quantized therein. Thereafter, the quantized transform coefficients are transmitted via two signal paths: one that leads toward an entropy coder 350, wherein the quantized transform coefficients are coded by using, for example, a combination of run-length and variable length coding; and the other that leads to an inverse quantization ("IQ") block 400 and then to an inverse DCT ("IDCT") block 450, wherein the quantized transform coefficients are converted back into reconstructed frame data. The reconstructed frame data is fed to the MC block 500 wherein the predicted frame data is obtained by using a motion estimation and compensation method which is known in the art.

The encoded data from the entropy coder 350 is fed to a buffer 600 and transmitted to a corresponding decoding system.

The controller 100 of the present invention serves to determine the inter/intra mode, the field/frame DCT mode and the quantization parameter on a macroblock basis and provide signals to notify the former two to the DPCM block 200 and the last one to the Q block 300. In response to the inter/intra mode signal, the DPCM block 200 provides the difference between the predicted frame data and the current frame data (inter mode), or the current frame data itself (intra mode) to the DCT block 250. The difference or the pixel values are provided in a unit of an 8×8 block and 8×8 DCT is performed therefor. Format of such blocks provided from the DPCM block 200 to the DCT block 250 depends on the field/frame DCT mode signal. In case of the frame DCT mode, the DPCM block 200 provides frame-organized blocks while in case of the field DCT mode, it provides field-organized blocks, so that the DCT block 250 can perform the field or the frame based DCT depending on the mode. The quatization parameter provided to the Q block 300 is utilized in adjusting the coarseness/fineness of the quantization and thereby controls the fullness of the buffer 600.

Figure 2:
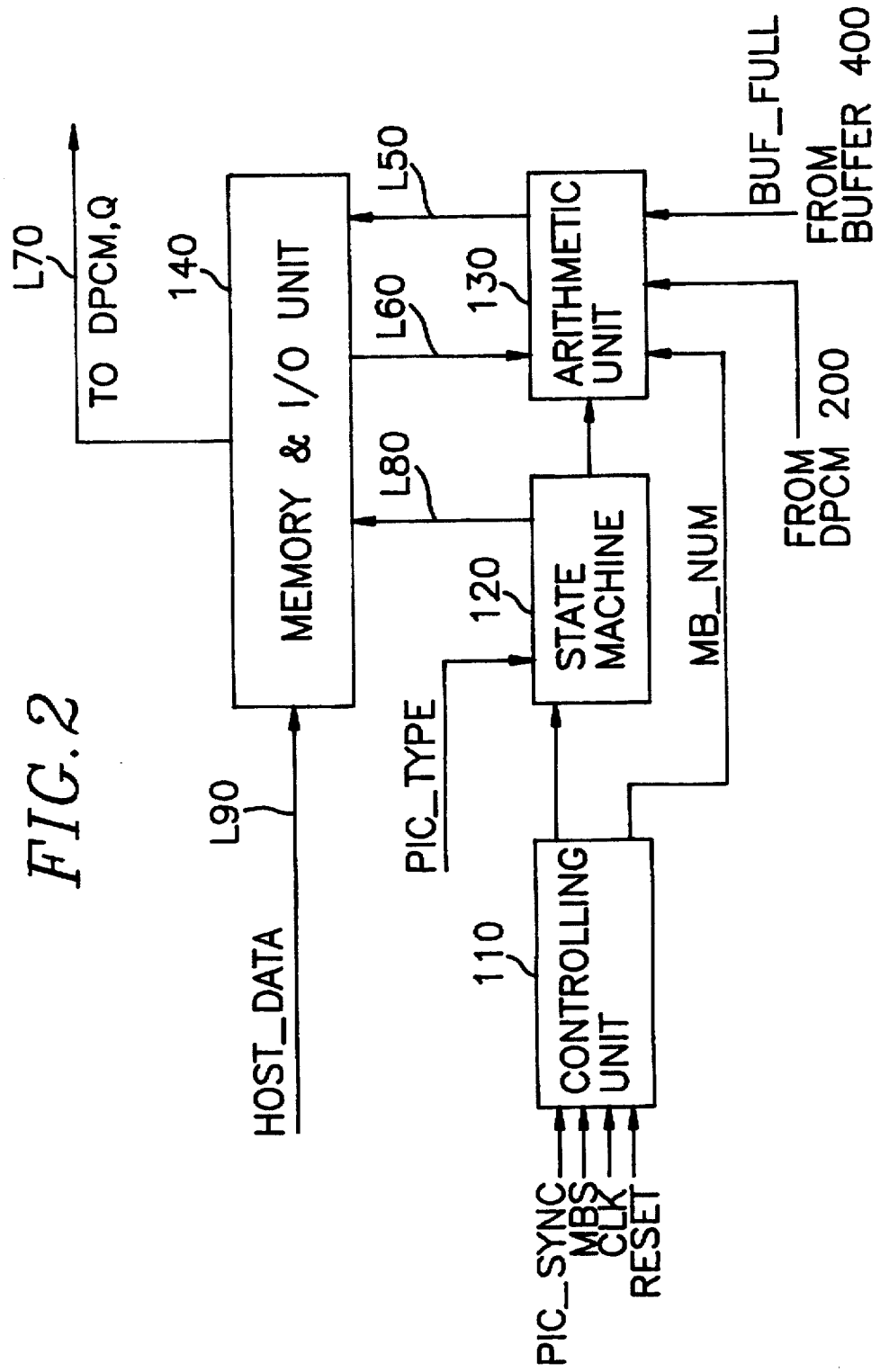
FIG. 2 depicts a detailed block diagram of the controller of the present invention.

Referring to FIG. 2, there is shown a detailed block diagram of the controller 100 shown in FIG. 1.

At the controller 100 of the present invention, all arithmetic calculations involved in the three types of decisions are performed at the arithmetic unit 130 with the help of a state machine 120 and a memory and I/O unit 140.

Input signals used to accomplish the tasks will be presented. The input signals are PIC_SYNC, MES, CLK, RESET, PIC_TYPE, BUF_FULL and the difference data or the current frame data from the DPCM block shown in FIG. 1, and so on. Of the input signals, PIC_SYNC and MBS which are fed to a controlling unit 110 shown in FIG. 2 represent a start of each frame and each macroblock, respectively. RESET and CLK are system control signals. PIC_TYPE inputted to the state machine 120 denotes which of three picture type, i.e., I, P or B, the currently processed frame belongs to. PIC_SYNC, MBS and PIC_TYPE may be obtained from the input video signal stream. BUF_FULL representing the state of the buffer 600 is inputted to the arithmetic unit 130.

Various initial constant values are necessary in doing the three decisions. Such values are predetermined according to a system design and are inputted to the controller 100 of the present invention, more specifically, to the memory and I/O unit 140 via L90 before the controller 100 performs the calculations. In the above equations, initial constant values of $X_i$, $X_p$, $X_b$, R, $N_b$ and $N_p$ at the start of the encoding process and values of $K_p$ and $K_b$ are some of such examples.

In response to the input signals thereto, the controlling unit 110 generates a couple of control signals and provides them to the state machine 120. First, the controlling unit 110 provides PRCS_PIC_MB denoting whether a picture based operation or a macroblock based operation is to be done at the controller 100, wherein the picture based and the macroblock based operations correspond to the equations given above which are performed per each picture and each macroblock, respectively. It is noted that examples of picture based operation is Eqs. 3A to 3C, 4A to 4C, 5 while those of macroblock based operation is Eqs. 1A, 1B, 2A, 2B, 7A to 7C, 8 to 13. Second, the controlling unit 110 generates MB_NUM which identifies a macroblock which is to be currently processed and provides it to the arithmetic unit 130.

In response to the input signals, e.g., PIC_TYPE and PRCS_PIC_MB, the state machine 120 generates a stream of control sequences and provides it to the arithmetic unit 130 and the memory and I/O unit 140, to thereby make the arithmetic unit 130 performing one of the equations described above. The state machine 120 may be programmed to generate the control sequences which are predetermined depending on which equation is performed at the arithmetic unit 130.

The memory and I/O unit 140 receives and stores the initial constant values from a host processor (not shown) on L90 and calculation results from the arithmetic unit 130 on L50. In response to the control sequence via L80 from the state machine 120, the memory and I/O unit 140 is controlled to provide on L60 the initial constant values and temporary values included in the calculation results, wherein the temporary values refer to such calculation results which are obtained from some of the equations and are also needed in calculating some other equations and which are updated for each macroblock (or picture) by using those of the previous macroblock (or picture). In the above equations, values of $T_i$, $T_p$, $T_b$, R, $d_j^i$, $d_j^p$ and $d_j^b$ in the course of the encoding process are some of such examples. The memory and I/O unit 140 is also controlled to output final result of the calculation, i.e., inter/intra, field/frame DCT modes and the quantization parameter, to the DPCM and the Q blocks 200 and 300 shown in FIG. 1. More detailed description of the operation of the arithmetic unit 130 and the memory and I/O unit 140 will be given with reference to FIGS. 3 and 4, respectively.

Figure 3:
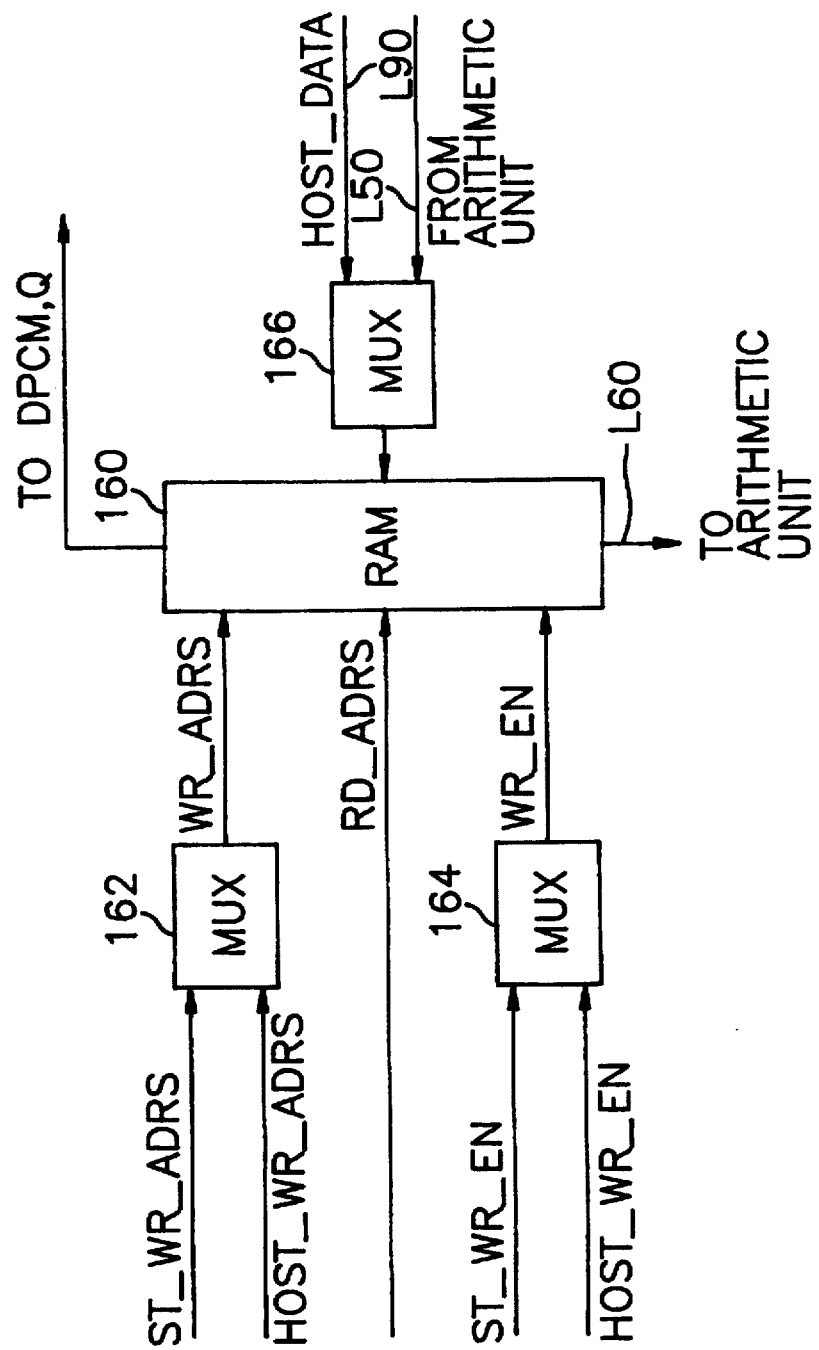
FIG. 3 represents a block diagram of the memory and I/O unit shown in FIG. 2.

Referring to FIG. 3, there is a block diagram of the memory and I/O unit 140 shown in FIG. 2.

HOST_DATA denotes the initial constant values which are used in performing the equations at the arithmetic unit 130. BIT_RATE, PICTURE_RATE, $K_p$ and $K_b$ in Eqs. 4A to 4C, initial constant values of $X_i$, $X_p$, $X_b$, R, $N_p$, $N_b$, $d_0^i$, $d_0^p$ and $d_0^b$ at the start of encoding process are examples of such initial constants provided as HOST_DATA. They are provided from the host processor which serves to store and provide the various initial constant values which are predetermined according to, e.g., a system design. At the start of encoding an image sequence, all the necessary constants are provided and stored at a RAM (Random Access Memory) 160 via MUX (Multiplexor) 166 on L90. At the time some of them are necessary at the arithmetic unit 130 in performing above mentioned equations, they are provided from the RAM 160 to the arithmetic unit 130 on L60.

The calculation result obtained at the arithmetic unit 130 are also fed to the MUX 166 via L50 and stored at the RAM 160. Examples of such calculation results are R, $N_p$, $N_b$, $T_i$, $T_p$, $T_b$ and so forth. R is the remaining number of bits assigned to the current GOP determined as specified by Eq. 5, which is stored in the RAM 160 and updated at the arithmetic unit 130 after a frame is encoded. $N_p$ and $N_b$ are the respective numbers of P and B pictures remaining in the current GOP, which are used in calculating the target bit number $T_i$, $T_p$ and $T_b$ according to Eqs. 4A to 4C.

ST_WR_ADRS and HOST_WR_ADRS are address signals used to write data, i.e., data from arithmetic unit 130 inputted via the MUX 166 and HOST_DATA, to the RAM 160, respectively. ST_WR_EN and HOST_WR_EN are enable signals which go to active state when data is written to the RAM 160.

While an initial constant value is being fed to the RAM 160, MUX's 162, 164 and 166 select HOST_WR_ADRS, HOST_WR_EN and HOST_DATA, respectively, HOST_WR_ADRS denoting the address of the RAM 160 where the initial constant value is to be stored and HOST_WR_

EN being an active state. Similarly, while the calculation result from the arithmetic unit 130 is inputted to the RAM 160, the MUX's 162, 164 and 166 select ST_WR_ADRS, ST_WR_EN and data on L50, respectively. ST_WR_ADRS denoting the address of the RAM 160 where the calculation result is to be stored and ST_WR_EN being an active state.

RD_ADRS is an address signal used to read data stored at the RAM 160 and to provide it either to the arithmetic unit 130, or the DPCM or Q block shown in FIG. 1. Specifically, the initial constant values or the temporary values determined at the arithmetic unit 130 are read from the RAM 160 and provided to the arithmetic unit 130 via L60. Meanwhile, the final results of three kinds of decisions, that is, the inter/intra and the field/frame DCT modes and the quantization parameter decision results Mquant$_j$, are fed to the DPCM and Q blocks shown in FIG. 1.

Figure 4:
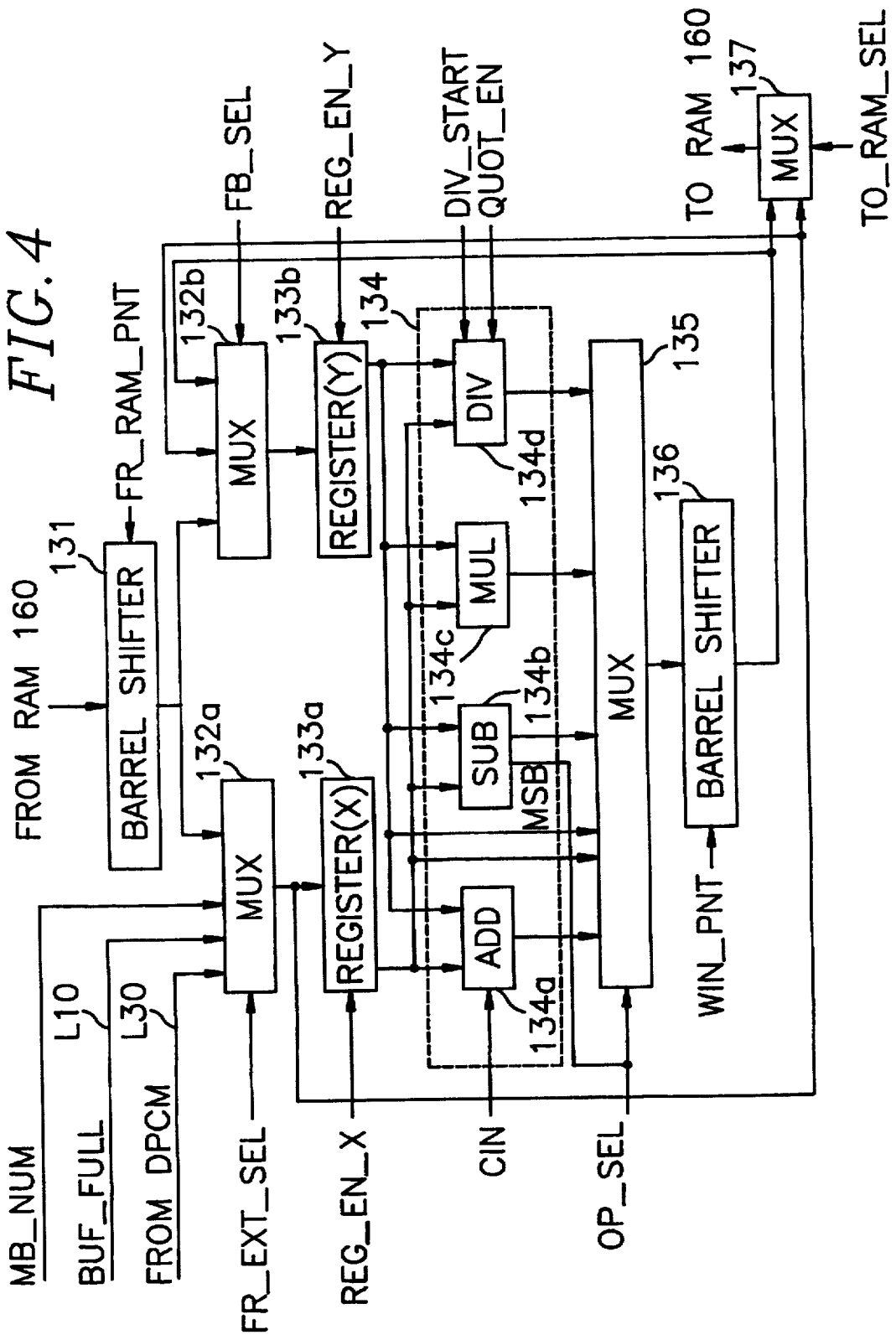
FIG. 4 provides a block diagram of the arithmetic unit shown in FIG. 2.
Figure 5:
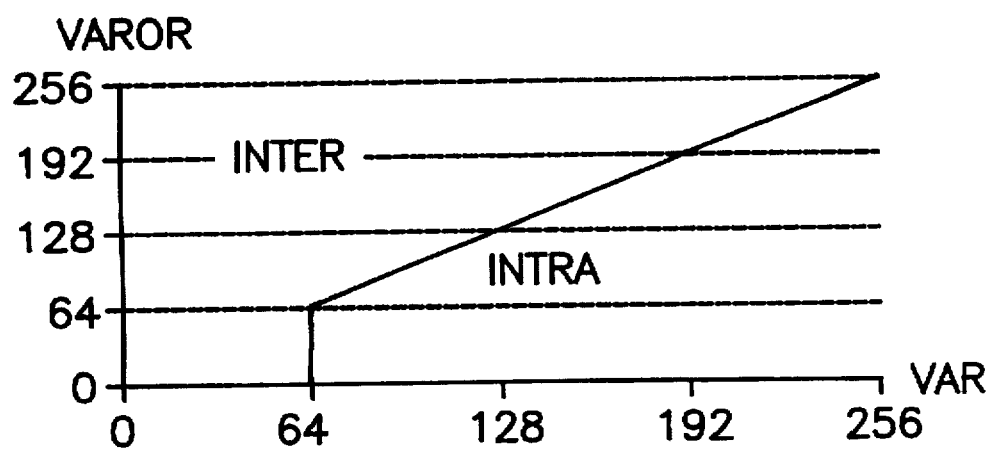
FIG. 5 illustrates a method for deciding an inter/intra mode by using VAR and VAROR.

Referring to FIG. 4, there is provided a block diagram of the arithmetic unit 130 shown in FIG. 2.

MB_NUM and BUF_FULL are fed to a MUX 132a from the controlling unit 110 and the buffer 600, respectively. The difference data or the current frame data from the DPCM block 200 is also fed to the MUX 132a. As described above, the initial constant values and the temporary values are provided from the memory and I/O unit 140 via L60, more specifically, from the RAM 160 shown in FIG. 3.

FR_EXT_SEL, REG_EN_X, REG_EN_Y, CIN, OPERATION_SEL, FEED_BACK_SEL, DIV_START, QUOT_EN, TO_RAM_SEL, WINDOW_PNT and FR_RAM_PNT are control signals which are included in the control sequence provided from the state machine 120 shown in FIG. 2. The various elements of the arithmetic unit 130 shown in FIG. 4 are controlled to perform arithmetic tasks according to the control sequence. The function of the control signals will now be presented.

(1) FR_RAM_PNT (or WIN_PNT) is valid when data is inputted to a barrel shifter 131 (or 136). The value of FR_RAM_PNT (or WIN_PNT) denotes the number of bits by which the input data is shifted at the barrel shifter 131 (or 136). For example, if FR_RAM_PNT is '2', output of the barrel shifter 131 is four times the input thereto.

(2) FR_EXT_SEL (or FB_SEL) represents which of the inputs to the MUX 132a (or 132b) is selected and provided to REGISTER(X) 133a (or REGISTER(Y) 133b).

(3) REG_EN_X (or REG_EN_Y) is in a valid state while data is being stored at REGISTER(X) (or REGISTER(Y))

(4) CIN, DIV_START, QUOT_START

These are signals for controlling a calculation block 134.

CIN denotes whether an ADD (Adder) 134a provide an addition result of two operands from REGISTER(X) and REGISTER(Y), or further increments the addition result by one.

DIV_START notifies the start of division operation to a DIV (DIVider) 134d.

QUOT_EN represents when a result of division, i.e., a quotient, is outputted from the DIV 134d. It should be enabled for one clock cycle after a latency of the DIV 134d from the start of the division.

Note that for other blocks included in the calculation block 134, i.e., the ADD 134a, a SUB (SUBtractor) 134b and a MUL (MULtiplier) 134c, an initiation or start signal is not used. On reading operands from REGISTER(X) and/or REGISTER(Y) inputted thereto, ADD, SUB, and MUL perform corresponding operations without waiting a start signal. Also note that for ADD, SUB and MUL, a signal corresponding to QUOT_EN is not used. On finishing calculation, ADD 134a, SUB 134b, and MUL 134c output the result promptly. ADD and SUB provide the result without a delay while DIV 134d and MUL 134c output the result after a predetermined delay.

(5) OP_SEL indicates to MUX 135 one of the operation results which are obtained at the calculation block 134. The calculation block 134 performs an addition, a subtraction, a multiplication and a division by using corresponding blocks, i.e., the ADD 134a, the SUB 134b, the MUL 134c and the DIV 134d, respectively. Other than these four operations, the calculation block 134 together with the MUX 135 compares two operands A and B, from REGISTER(X) 133a and REGISTER(Y) 133b, respectively. Comparison is performed by first subtracting one operand(B) from the other (A) and then by selecting one of the operands at the MUX 135 according to a sign of the subtraction result. As shown in FIG. 4, MSB or sign bit of the output from SUB 134b constitutes one bit of OP_SEL, thereby affecting the selection. For example, in case the sign is '+', A is selected as the output oL a MUX 135; otherwise B is selected.

(6) TO_RAM_SEL is valid while data from the arithmetic unit 130 is being written to the RAM 160. It also denotes which of two inputs to a MUX 137, one from the MUX 132a and the other from the barrel shifter 136, is provided to the RAM 160.

Now, subblocks of the arithmetic unit 130 will be described with an exemplary procedure for calculating $T_i$ according to the equation;

$$T_i = \max\left[\frac{R}{1 + \frac{N_p \times X_p}{X_i \times K_p} + \frac{N_b \times X_b}{X_i \times K_b}}, \frac{BIT\_RATE}{8 \times P\_RATE}\right].$$

First, a procedure for calculating $(N_p \times X_p)/(X_i \times K_p)$ will be presented. The procedure consists of following 10 steps. In each step, control signals, which are to be provided from the state machine 120 for doing the task allotted to that step, are specified along with its functions. The remaining control signals which are not specified in each step but are included in the control sequence, are in a "Don't care" state, which means that these signals are not relevant in doing the corresponding task.

[1] Reading $X_i$ from the RAM 160 to REGISTER(X) 133a

RD_ADRS: address of $X_i$ in the RAM 160

FR_RAM_PNT: '0' (which means data from the RAM 160 is not multiplied with $2^n$, n being a nonnegative integer)

FR_EXT_SEL: selects output from the barrel shifter 131

REG_EN_X: enable REGISTER(X) for 1 clock cycle to prevent other irrelevant data from being overwritten on $X_i$ value at REGISTER(X)

[2] Reading $K_p$ from the RAM 160

RD_ADRS: address of $K_p$ in the RAM 160

FR_RAM_PNT: '0'

FB_SEL: selects output from the barrel shifter 131

REG_EN_Y: enables REGISTER(Y) for 1 clock cycle to prevent other irrelevant data from being overwritten on $K_p$ value at REGISTER(Y)

[3] Starting $X_i \times K_p$ and reading $N_p$

The two tasks are done simultaneously. In initiating $X_i \times K_p$, no control signal is necessary.

The followings are for reading $N_p$.

RD_ADRS: address of $N_p$ in the RAM 160

FR_RAM_PNT: '0'

FR_EXT_SEL: selects output from the barrel shifter 131

REG_EN_X: enables REGISTER(X) for 1 clock

[4] Reading $X_p$ from the RAM 160
  RD_ADRS: address of $X_p$ in the RAM 160
  FR_RAM_PNT: '0'
  FB_SEL: selects output from the barrel shifter 131
  REG_EN_Y: enables REGISTER(Y) for 1 clock cycle
[5] Starting $N_p \times X_p$
  No control signal needed.
[6] Finishing $X_i \times K_p$ and writing the result to the RAM 160
  OP_SEL: selects an output from the MUL 134c
  WIN_PNT: '0' (means data from the MUX 135 is not multiplied with $2^n$)
  TO_RAM_SEL: selects output from the barrel shifter 136 and provides it to the RAM 160.
[7] Reading $X_i \times K_p$ from the RAM 160
  RD_ADRS: address of $X_i \times K_p$
  FR_RAM_PNT: '0' (which means data from the RAM 160 is not multiplied with $2^n$)
  FR_EXT_SEL: selects output from the barrel shifter 131
  REG_EN_X: enables REGISTER(X) for 1 clock cycle
[8] Finish $(N_p \times X_p)$ and feedback the result to REGISTER (Y)
  OP_SEL: selects output from the MUL 134c
  WIN_PNT: '0'
  FB_SEL: selects an output from the barrel shifter 136
  REG_EN_X: disable REGISTER(X) for 1 clock cycle
  REG_EN_Y: enable the REGISTER(Y) 133b for 1 clock cycle
[9] Starting $(N_p \times X_p)/(X_i \times K_p)$
  DIV_START: notifies the start of division to the DIV 134d
[10] Finishing $(N_p \times X_p)/(X_i \times K_p)$ and writing the result to the RAM 160
  QUOT_EN: couples the result of the division to the MUX 135
  OP_SEL: selects output from the DIV 134d
  WIN_PNT: '0'
  TO_RAM_SEL: selects output from the barrel shifter 136.
  ST_WR_ADRS: address where $(N_p \times X_p)/(X_i \times K_p)$ is written.
  ST_WR_EN: enables writing operation of the RAM 160.

With a similar procedure as described above as step [1] to [10], $(N_b \times X_b)/(X_i \times K_b)$ is calculated and stored at the RAM 160. The result is also fed to REGISTER(Y) 133b with the help of FE_SEL and REG_EN_Y. After that, steps [11] to [17] continue.

[11] Reading $(N_p \times X_p)/(X_i \times K_p)$ to REGISTER(X) 133a similar to step [1]. Note that the data was stored at the RAM 160 at step [10]
[12] Calculating $1+(N_b \times X_b)/(X_i \times K_b) + (N_p \times X_p)/(X_i \times K_p)$ and feeding the result to REGISTER(Y)
  CIN: denotes that 1 is added to the addition result of two operands.
  OP_SEL: selects output of the ADD 134a.
  WIN_PNT: '0'
  FE_SEL: selects output from the barrel shifter 136.
  REG_EN_Y: enabled for 1 clock cycle.
[13] Reading R from the RAM 160 to REGISTER(X) 133a similar to step [1]
[14] Starting $R/1+(N_b \times X_b)/(X_i \times K_b)+(N_p \times X_p)/(X_i \times K_p)$
  DIV_START: notify the start of division to the DIV 134d.
[15] Finishing $R/1+(N_b \times X_b)/(X_i \times K_b)+(N_p \times X_p)/(X_i \times K_p)$ and feeding the result to REGISTER(Y)
  QUOT_EN: couple the result of the division to the MUX 135
  OP_SEL: select output from the DIV 134d
  WIN_PNT: '0'
  FB_SEL: select output from the barrel shifter 136.
  REG_EN_Y: enabled for 1 clock cycle.
[16] Reading BIT_RATE/(8×PICTURE_RATE) from the RAM 160 to REGISTER(X) similar to step [1]
[17] Comparing $R/1+(N_b \times X_b)/(X_i \times K_b)+(N_p \times X_p)/(X_i \times K_p)$ with BIT_RATE/(8×PICTURE_RATE), selecting a larger one and storing it to the RAM 160.
  OP_SEL: select output from either RESGITER(X) or REGISTER(Y) depending on the sign bit (or MSB) of the SUB 134b output.
  WIN_PNT: '0'
  TO_RAM_SEL: selects output from the barrel shifter 136.
  ST_WR_ADRS: denotes an address where $T_i$ is written.
  ST_WR_EN: enables a writing operation of the RAM 160.

By doing the above procedure step by step, the calculation of $T_i$ given in Eq. 4A, which includes additions, multiplications, divisions, a comparison and data fetch from and storing at the RAM 160, is completed. Other equations may also be calculated in a similar manner. By obtaining the result of the equations, the three tasks designated to the controller 100 of the present invention are performed.

While the present invention has been described with respect to the particular embodiments, it will be apparent to those skilled in the art that various changes and modifications may be made without departing from the spirit and scope of the invention as defined in the following claims.

What is claimed is:

1. A controller, for use in a video signal encoding system, for deciding an inter/intra mode, a field/frame DCT mode and a quantization parameter, wherein the video signal contains a multiplicity of GOP's, each of the GOP's being classified into three types of pictures, with each of the pictures being divided into a multiplicity of macroblocks, and the encoding system has means for generating a differential pulse code modulated (DPCM) macroblock for each macroblock to be encoded and means for generating buffer state data representing the occupation level of a buffer for temporarily storing predetermined encoded video data, the controller comprising:

a state machine for generating a control sequence which includes a plurality of control signals in response to the type of a picture currently encoded and a signal denoting a start of the picture;

an arithmetic unit for generating, in response to the control sequence, a selected calculation result or a temporary value for each of the macroblocks in the picture, wherein the arithmetic unit includes:
    a first input means, in response to the control sequence, for selecting a first input value among the sequential number of a target macroblock, the buffer state data, a DPCM macroblock corresponding to the target macroblock, initial constant values and the temporary value;
    a second input means, in response to the control sequence, for selecting a second input value among the initial constant values, the temporary values and the first input value;

a first and a second register, in response to the control sequence, for storing and providing the first and the second input values, respectively;

a calculation means, in response to the control sequence, for performing an addition, a subtraction, a multiplication, a division and a comparison of the first with the second input values, to thereby provide a set of calculation results consisting of an addition result, a multiplication result, a subtraction result, a division result and a comparison result;

a selection means, in response to the control sequence, for selecting one of the calculation results; and an output means, in response to the control sequence, for providing the selected calculation result or the first input value as the temporary value either to the second input means or to a memory and input/output unit; and the memory and input/output unit for storing the initial constant values, providing the initial constant values to the arithmetic unit, for storing temporary values determined at the arithmetic unit and, in response to the control sequence, for providing a set of control values for each of the macroblocks in the picture based on the temporary values, the set of control values denoting the inter/intra mode, the field/frame DCT mode and the quantization parameter to be used in encoding the video signal.

2. The controller of claim 1 wherein the calculation means contains:

means for providing the addition result by adding the first and the second input values;

means for providing the subtraction result by subtracting the second input value from the first input value, the subtraction result consisting of a sign and an absolute value;

means for providing the multiplication result after a predetermined amount of first delay from the time the first and the second input values are inputted thereto, by multiplying the first and the second input values; and means for providing the division result after a predetermined amount of second delay from the time the first and the second input values are inputted thereto, by dividing the first input value by the second input value.

3. The controller of claim 2 wherein the control sequence includes:

a first and a second input selection signals in response to which the first and the second input means select the first and the second input values, respectively;

a first and a second register enable signals, in response to which the first and the second registers store the first and the second input values, respectively;

an addition control signal notifying whether the adding means further adds one to the addition results;

a division start signal in response to which the dividing means starts the division;

a division end signal representing when the division is completed at the dividing means;

an operation selection signal in response to which the selection means selects one of the calculation results, wherein, in case that the comparison result is selected therein, the selection means selects either the first or the second input value in response to the operation selection signal and the sign of the subtraction result; and a selection signal in response to which the output means provides the selected calculation result or the first input value either to the second input means as one of the second set of input values or to the memory and input/output unit.

4. The controller of claim 1, wherein the memory and the input/output unit includes:

a memory means wherein the initial constant values and the control values are stored;

a reading means for providing the control values and the initial constant values in response to the control sequence; and a writing means for inputting to and storing at the memory means the control values in response to the control sequence.

5. The controller of claim 4, wherein the control sequence further includes:

write address signals which denote locations in the memory means where the initial constant values and the control values are stored;

write enable signals, wherein each write enable signal becomes an active state when one of the initial constant values or the control values is stored at the memory means; and read address signals which denote locations in the memory means from which the initial constant values and the control values are provided.

6. The controller of claim 4, wherein the arithmetic unit further generates temporary values in the course of calculating the group of predetermined equations;

the temporary values are stored at the memory means;

said reading means further provides the temporary values to the arithmetic unit in response to the control sequence; and said writing means further inputs to and stores at the memory means the temporary values in response to the control sequence.

7. The controller of claim 6, wherein the control sequence includes:

write address signals which denote locations in the memory means where the initial constant values, the control values and the temporary values are stored;

write enable signals, wherein each write enable signal becomes an active state when one of the initial constant values, the control values or the temporary values is stored at the memory means; and read address signals which denote locations in the memory means from which the initial constant values, the control values, and the temporary values are provided.

8. A video signal encoding system having a controller for deciding an inter/intra mode, a field/frame DCT mode and a quantization parameter, wherein the video signal contains a multiplicity of GOP's each of the GOP's being classified into three types of pictures, with each of the pictures being divided into a multiplicity of macroblocks, and the encoding system has means for generating a differential pulse code modulated (DPCM) macroblock for each macroblock to be encoded and means for generating buffer state data representing the fullness of a buffer for temporarily storing predetermined encoded video data, said controller comprising:

a state machine for generating a control sequence which includes a plurality of control signals in response to the type of a picture currently encoded and a signal denoting a start of the picture;

an arithmetic unit for generating, in response to the control sequence, a selected calculation result or a temporary value for each of the macroblocks in the picture, wherein the arithmetic unit includes:

a first input means, in response to the control sequence, for selecting a first input value among the sequential number of a target macroblock, the buffer state data, a DPCM macroblock corresponding to the target macroblock, initial constant values and the temporary value;

a second input means, in response to the control sequence, for selecting a second input value among the initial constant values, the temporary values and the first input value;

a first and a second register, in response to the control sequence, for storing and providing the first and the second input values, respectively;

a calculation means, in response to the control sequence, for performing an addition, a subtraction, a multiplication, a division and a comparison of the first and the second input values, to thereby provide a set of calculation results consisting of an addition result, a multiplication result, a subtraction result, a division result and a comparison result;

a selection means, in response to the control sequence, for selecting one of the calculation results; and an output means, in response to the control sequence, for providing the selected calculation result or the first input value as the temporary value either to the second input means or to a memory and input/output unit; and the memory and input/output unit for storing the initial constant values, providing the initial constant values to the arithmetic unit, for storing temporary values determined at the arithmetic unit and, in response to the control sequence, for providing a set of control values for each of the macroblocks in the picture based on the temporary values, the set of control values denoting the inter/intra mode, the field/frame DCT mode and the quantization parameter to be used in encoding the video signal.

9. The video signal encoding system of claim 8, wherein the calculation means has:

means for providing the addition result by adding the first to the second input values;

means for providing the subtraction result by subtracting the second input value from the first input value, the subtraction result consisting of a sign and an absolute value;

means for providing the multiplication result after a predetermined amount of first delay from the time the first and the input values are inputted thereto, by multiplying the first by the second input values; and means for providing the division result after a predetermined amount of second delay from the time the first and the input values are inputted thereto, by dividing the first input value by the second input value.

10. The video signal encoding system of claim 9, wherein the control sequence includes:

a first and a second input selection signals in response to which the first and the second input means select the first and the second input values, respectively;

a first and a second register enable signals, in response to which the first and the second registers store the first and the second input values, respectively;

an addition control signal notifying whether the adding means further adds one to the addition results;

a division start signal in response to which the dividing means starts the division;

a division end signal representing when the division is completed at the dividing means;

an operation selection signal in response to which the selection means selects one of the calculation results, wherein, in case that the comparison result is selected therein, the selection means selects either the first or the second input value in response to the operation selection signal and the sign of the subtraction result; and a selection signal in response to which the output means provides the selected calculation result or the first input value either to the second input means as one of the second set of input values or to the memory and input/output unit.

11. The video encoding system of claim 10, wherein said memory and the input/output unit includes:

a memory means wherein the initial constant values and the control values are stored;

a reading means for providing the control values and the initial constant values in response to the control sequence; and a writing means for inputting to and storing at the memory means the control values in response to the control sequence.

12. The video encoding system of claim 11, wherein the control sequence further includes:

write address signals which denote locations in the memory means where the initial constant values and the control values are stored;

write enable signals wherein each write enable signal becomes an active state when one of the initial constant values or the control values is stored at the memory means; and read address signals which denote locations in the memory means from which the initial constant values and the control values are provided.

13. The video encoding system of claim 12, wherein the arithmetic unit further generates temporary values in the course of calculating the group of predetermined equations;

the temporary values are further stored at the memory means;

said reading means provides the temporary values to the arithmetic unit in response to the control sequence; and said writing means further inputs to and stores at the memory means the temporary values in response to the control sequence.

14. The video encoding system of claim 13, wherein the control sequence includes:

write address signals which denote locations in the memory means where the initial constant values, the control values and the temporary values are stored;

write enable signals, wherein each write enable signal becomes an active state when one of the initial constant values, the control values or the temporary values is stored at the memory means; and read address signals which denote locations in the memory means from which the initial constant values, the control values, and the temporary values are provided.

* * * * *